United States Patent [19]

Balsam

[11] 3,871,610
[45] Mar. 18, 1975

[54] OPTICAL MOLD FORMING MEANS
[75] Inventor: Philip J. Balsam, Stamford, Conn.
[73] Assignee: Beattie Development Company, Stamford, Conn.
[22] Filed: Sept. 14, 1972
[21] Appl. No.: 289,198

[52] U.S. Cl.............. 249/102, 249/121, 425/175, 425/808
[51] Int. Cl. .............................................. B29c 1/02
[58] Field of Search ........... 425/175, 338, 408, 470, 425/808, DIG. 29; 264/1, 220, 225–227; 249/81, 155, 102–104, 160–161, 219 R, 119, 121, 124–125

[56] References Cited
UNITED STATES PATENTS

| | | | |
|---|---|---|---|
| 2,880,463 | 4/1959 | Lazaar | 249/124 |
| 3,278,654 | 10/1966 | Grandperret | 425/808 |
| 3,296,956 | 1/1967 | Turner | 249/125 |
| 3,310,276 | 3/1967 | Bonney | 249/219 R |
| 3,710,849 | 1/1973 | Hines & Culver | 425/808 |

Primary Examiner—Robert D. Baldwin
Assistant Examiner—John McQuade
Attorney, Agent, or Firm—Homer O. Blair; Robert L. Nathans; Gerald H. Glanzman

[57] ABSTRACT

A matrix for use in molding plastic optical components. The matrix includes a frame having a plurality of apertures within which a plurality of ring assemblies are removably mounted. Each of the ring assemblies includes structure for maintaining a master lens having a mold surface ground and polished to the desired shape firmly and accurately maintained in the correct orientation during the molding of plastic optical components against the matrix. The ring assemblies ensure proper alignment of the lens masters throughout large numbers of molding operations and should any one of the lens masters break or otherwise become damaged, the ring assembly containing that lens may readily be removed from the matrix frame and replaced with a new one without necessitating replacement of the entire matrix.

14 Claims, 1 Drawing Figure

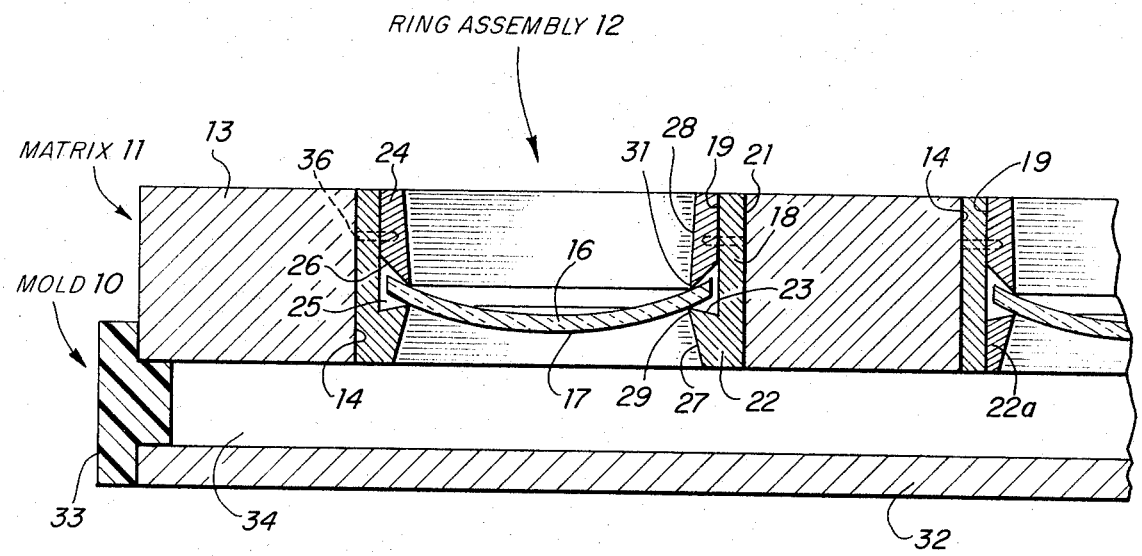

3,871,610

OPTICAL MOLD FORMING MEANS

BACKGROUND OF THE INVENTION

1. Field of the Invention

The present invention relates generally to a matrix for use in molding plastic components. More specifically, the invention relates to a ring assembly for individually mounting a plurality of components within a matrix structure.

2. Description of the Prior Art

In U.S. Pat. application Ser. No. 210,488, filed on Dec. 21, 1971, now U.S. Pat. No. 3,806,079 to John O. Beattie, apparatus is described for producing plastic plaques to be used in the manufacture of plastic ophthalmic lenses. As taught in this application, these plaques are produced by molding them against a matrix within which a plurality of ground and polished master lenses are supported, such that after molding, the plaques will have a plurality of surface areas formed thereon which negatively reproduce the surfaces on the master lenses. (It should be understood that the terms "molding" or "moldable material" as used herein are intended to include casting operations and "castable" materials.)

As further described in the above-mentioned application, the matrix against which the plaques are molded consists of a frame having a plurality of apertures extending through it within which the master lenses are supported. More specifically, the walls of each aperture are formed with an annular ledge and the master lenses are carefully positioned against these ledges and then permanently sealed in place with an appropriate sealing compound.

In practice, this structure has not been fully satisfactory. Initially, with the above-described design, the master lenses are permanently attached to the matrix frame, and the damaging of any one of the master lenses within the matrix will damage the entire assembly and often necessitate that it be replaced in its entirety. Since these master lenses are provided with high quality optical surfaces that have been carefully finished to a high degree of accuracy, they are quite expensive and, accordingly, replacement of the entire matrix, which conventionally may include 25 or more lenses, is quite costly.

Furthermore, in the use of the matrix to mold plastic plaques thereagainst, substantial stresses are generated during curing which act upon the individual master lenses and may tend to either displace or damage them. These stresses limit the number of times that the matrix may be used before replacement and an extended operating life for them would be desirable.

In addition, manufacture of the matrix is, at present, a somewhat tedious operation both in making the frame with its ledged apertures and in accurately positioning and securing the master lenses to the frame.

BRIEF SUMMARY OF A PREFERRED EMBODIMENT OF THE INVENTION

In accordance with an embodiment of the present invention, the above and other deficiencies have been obviated by providing a novel ring assembly by which the individual master lenses may be supported in the matrix. In accordance with a preferred embodiment of the invention, each master lens is supported between shoulder portions of inner and outer ring shaped elements which may be press-fit or otherwise secured together. One of these ring assemblies may then be press-fit or otherwise positioned within each aperture of the matrix frame to provide the finished matrix structure.

With this structure, should any one of the master lenses break or otherwise become damaged, it is only necessary to remove the individual ring assembly containing that lens and replace it with a new one. Replacement of the entire matrix is no longer necessary. This obviously results in a substantial savings in both cost and labor.

Also, the present invention enables the lenses to be properly positioned and secured within the matrix more accurately and with less effort. In particular, the ring assembly is designed to firmly maintain each lens in the proper orientation within its respective aperture and prevent it from being displaced during the molding of large numbers of plastic plaques thereagainst. In one embodiment, the moldable material of which the plaques are made may itself be used to provide a strong, permanent bond to assist in rigidly maintaining the lens in place.

A further feature provided by the present invention is its inherent flexibility. For example, with the present invention, it becomes a simple matter to replace individual lens masters within the matrix with other lens masters having different curvatures. This enables plaques having any desired surface characteristics to be produced with a minimum of inconvenience. Yet further features and advantages of the present invention will be explained in detail hereinafter along with a detailed description of the drawings.

BRIEF DESCRIPTION OF THE DRAWINGS

The single FIGURE illustrates, in cross-sectional form, a portion of a matrix incorporating ring assemblies in accordance with a preferred embodiment of the present invention being utilized to mold plastic optical elements.

DETAILED DESCRIPTION OF THE PREFERRED EMBODIMENTS OF THE INVENTION

The FIGURE schematically illustrates a matrix 11 incorporating ring assemblies 12 in accordance with a preferred embodiment of the present invention. In the FIGURE, the matrix is being utilized in a mold 10 to mold plastic plaques for use in the manufacture of plastic ophthalmic lenses. It should be understood, however, that it is not intended to limit the matrix to this particular application. It could readily be utilized in many other types of molding operations and, in general, to support an array of elements in a variety of fields.

As illustrated in the FIGURE, matrix 111 consists of a frame 13 having a plurality of spaced apertures 14 extending through it. To cast plastic plaques, frame 13 is preferably rectangular in shape and provided with 25 or more equally spaced apertures arranged in an array of rows and columns. It may obviously be of any desired shape or size, however, depending on the particular application. The frame is also preferably constructed of aluminum because of its light weight and compatability with the moldable materials used to cast the plaques, but this again is optional.

As described previously, lens masters 16, each having surfaces 17 which have been ground and polished to the desired characteristics, are adapted to be supported within each of the apertures 14 of the frame 13 in order that a plastic plaque may be molded within a mold cavity 34 to provide the plaque with a plurality of surface areas which negatively reproduce surfaces 17 on the lens masters. In order to ensure that the surface areas on the plaque have the desired characteristics and are of uniform high quality, it is necessary that the master lenses, which may be of plastic, glass, or some other material capable of receiving the desired surface characteristics, be accurately positioned and maintained within the apertures and that they do not become displaced through use. Furthermore, it is necessary that the lenses and their mountings be capable of withstanding the stresses and temperatures of the molding operation without becoming distorted or misaligned. Finally, should one of the master lenses break or become damaged, it must be possible to remove the damaged lens from the matrix and replace it with a new one without affecting the remainder of the matrix.

These and other advantages are obtained by employing a ring assembly in accordance with the present invention. Referring back to the FIGURE, ring assembly 12 in accordance with a preferred embodiment includes an outer annular ring or sleeve 18 having inner and outer walls 19 and 21, respectively. Ring 18 is formed with an inwardly extending annular projection 22 which is preferably integral with sleeve 18, however, it could also be a separate element 22a, attached to sleeve 18 if desired, both embodiments being illustrated in the FIGURE. Projection 22 (or 22a) forms a first shoulder 23 with respect to the inner wall 19 of sleeve 18 which shoulder is provided for a reason to be explained in greater detail hereinafter.

The ring assembly 12 is also provided with an annular inner ring 24 which is adapted to be positioned within outer ring or sleeve 18 in mating relationship with inner wall 19. This inner ring forms a second shoulder 26 with respect to inner wall 19.

As can be seen in the FIGURE, shoulders 23 and 26 and inner wall 19 define and annular cavity 25 within which the lens master 16 is adapted to be supported. In particular, shoulders 23 and 26 inclined relative to the surfaces of the lens master so as to support the lens between relatively sharp annular edges or rims 29 and 31 formed at the junctions of shoulders 23 and 26 and inner faces 27 and 28, respectively. This specific construction accomplishes several objectives. Initially, it provides a minimum area of contact between the rings and the lens to minimize damage to the lens surfaces. Also, it enables the lens to be held firmly in position completely around its circumference with a uniform pressure. In the previously described design wherein the lens was bonded to a ledge with a sealing compound, a uniform support around the lens circumference was difficult to achieve and the lens would tend to separate at weakened areas. Furthermore, with this construction it can be seen that the periphery of the lens extends partially within the annular cavity 25. In this regard, the diameter of sleeve 18 is chosen to be slightly greater than the diameter of the lens 16 so that the lens will not contact wall 19 of the sleeve. This means that there will be a narrow clearance between the lens and the wall 19 as well as between the lens and the shoulders 23 and 26, i.e. the lens will fit within the annular cavity with a "positive clearance fit." This enables the lens to be supported between edges 29 and 31 slightly in from its periphery to further improve the support and in addition renders the ring assembly usable with lens masters of widely varying curvature and shape without modification.

Some of the important features of the present invention may be better understood by briefly describing the manner in which the mold of FIG. 1 is constructed. Initially, the lens master 16 is positioned upon annular edge 29 of the outer sleeve 18 and substantially centered thereon so as to leave a slight clearance between the edge of the lens master and the inner wall 19 of the sleeve. The inner ring 24 is then pressed into the outer ring until its edge 31 firmly presses against the lens as shown. The inner ring may be held in place by a simple press fit with inner wall 19 of the sleeve or secured in other ways as will be explained hereinafter. A ring assembly is then provided in which the lens master is uniformly and rigidly supported between the rings around its entire circumference and automatically maintained in the proper alignment. The entire ring assembly is then press-fit threaded, pinned or otherwise positioned within the aperture 14 of the matrix frame 11. By inserting a separate ring assembly into each aperture, a completed matrix is provided.

After the matrix has been constructed in this manner, the mold is formed by providing a second mold plate schematically illustrated at 32 and spacing it from the matrix with an appropriate gasket 33. A moldable material may then be injected by any well known technique into the mold cavity 34 for molding the plastic plaques therein.

At this point, a further aspect of the invention may be recognized. During the molding of the first plaque within the cavity 34, the moldable material may be permitted to enter into the annular cavity 25 of each of the ring assemblies formed between the shoulders 23 and 26. This moldable material will then become cured within the cavity simultaneously within the curing of the plaque and in this way provide a rigid bonding medium to hold the lens master within the rings. Since the most likely time for the lens to become displaced occurs during separation of the matrix from the molded plaque there is very little danger that the lens will become displaced prior to the time that the first plaque is cured within the cavity. In this regard also, the face 27 of the ring 18 is inclined at a slight angle to facilitate plaque separation.

Although the above-described assembly is quite effective in securely supporting the lens masters throughout a large number of plaque molding operations, certain design modifications may readily be made to accommodate diverse conditions. For example, when the stresses generated during molding are particularly strong, it may be desirable to provide additional security against separation of the rings. This may readily be accomplished by drilling a plurality of apertures through the outer ring 18 and partially through the inner ring 24 (e.g. four apertures at 90° intervals) and inserting shear pins into these apertures as illustrated by dotted lines 36 in the FIGURE. Alternatively, the upper end of sleeve 18 may be deformed or crimped over the inner ring to prevent it from being forced out. Yet other techiques may also be used, if desired.

Furthermore, in certain operations, it is preferable to prevent the moldable material from entering into the annular cavity 25 and becoming cured therein. This situation exists when the moldable material is of a composition that has a greater coefficient of expansion than the rings (which are generally of aluminum). In such a situation, were the moldable material permitted to enter into the cavity, it could eventually force the ring sections apart due to its expansion. It may be kept out of the cavity, at least to some extent, by inserting a suitable flexible filler material into the cavity to block its entrance.

In summary, the major features of the present invention should be apparent from the above description. Initially, should any one of the lens masters within the matrix break or otherwise become damaged, it is only necessary to remove the particular ring assembly within which that lens is mounted and replace it with a new one. The remainder of the matrix will be uneffected and significant savings in both labor and expense will be realized. In addition, a single ring structure is capable of accommodating lenses of widely varying curvature and shape without alteration. Also, the present invention makes it a simple matter to construct matrices with lenses of any desired shape in order to produce plaques having any desired characteristics. Furthermore, the ring assembly is very effective in maintaining the lens masters accurately positioned and rigidly secured through extended usage. In particular, with the present construction, a great many plaques may be molded against the matrix before replacement becomes necessary.

In general, the entire construction of the matrix is made much simpler and more economical. The matrix plate may simply be provided with uniform apertures. They no longer need be provided with accurately located ledges to hold the lens. The ring assemblies may readily be assembled at one location for insertion into matrix frames at another location resulting in more efficient operation.

It should be recognized that the above-described embodiments are intended to be exemplary only of the present invention and that other modifications and alterations would readily present themselves to persons of ordinary skill in the art. For this reason it should be understood that the present invention should be limited only as required by the scope of the following claims.

I claim:

1. A matrix for molding a plastic component comprising:
    a. a frame having a plurality of apertures therein;
    b. a plurality of ring assemblies positioned within said apertures, each of said ring assemblies comprising:
        1. an annular sleeve having inner and outer walls;
        2. first inner annular support means positioned within said sleeve adjacent said inner wall for defining a first shoulder with respect to said inner wall;
        3. second inner annular support means positioned within said sleeve adjacent said inner wall for defining a second shoulder with respect to said inner wall, said first and second shoulders being positioned in faced relationship and spaced from each other for defining a substantially annular cavity therebetween; and
        4. a mold element having a mold surface against which said plastic component is to be molded supported between said first and second shoulders; and
    c. means for removably supporting said plurality of ring assemblies within said plurality of apertures.

2. A matrix as recited in claim 1 wherein said first and second inner annular support means include first and second inner faces, respectively, and wherein said first and second inner faces are angled with respect to said first and second shoulders, respectively, to define first and second annular substantially sharp edges at their junctures for supporting said mold element therebetween.

3. A matrix as recited in claim 2 wherein the periphery of said mold element extends within said annular cavity with a positive clearance fit.

4. A matrix as recited in claim 1 wherein said first inner annular support means is integral with said sleeve.

5. A matrix as recited in claim 1 including means for securing said second inner annular support means to said sleeve.

6. A matrix as recited in claim 5 wherein said securing means comprises means for securing said second inner annular support means to the inner wall of said sleeve with a press-fit.

7. A matrix as recited in claim 5 wherein said securing means includes a plurality of pins for coupling said second inner annular support means to said sleeve.

8. A matrix assembly as recited in claim 1 wherein said means for releasably supporting each of said plurality of ring assemblies within said plurality of apertures comprise a press-fit between the walls of said apertures and the outer walls of said sleeves.

9. A matrix assembly as recited in claim 1 wherein said mold elements comprises lenses.

10. A matrix assembly as recited in claim 1 wherein said annular sleeves and said first and second inner annular support means are constructed of aluminum.

11. Apparatus for molding a plastic component from moldable material comprising:
    a. first mold member;
    b. a second mold member, said second mold member including:
        1. a frame having a plurality of apertures therein;
        2. a separate ring assembly positioned within each of said plurality of apertures, each of said ring assemblies including:
            i. an annular sleeve having inner and outer walls;
            ii. a first inner annular support means positioned within said sleeve adjacent said inner wall for defining a first shoulder with respect to said inner wall;
            iii. a second inner annular support means positioned within said sleeve adjacent said inner wall for defining a second shoulder with respect to said inner wall, said first and second shoulders being positioned in faced relationship and spaced from each other for defining a substantially annular cavity therebetween; and
            iv. a mold element having a mold surface against which said plastic component is to be molded supported between said first and second shoulders;
        3. means for releasably securing each of said ring assemblies within each of said plurality of apertures; and
    c. means for supporting said first and second mold members in spaced relationship for defining a mold cavity therebetween for receiving said moldable material for molding said plastic component therein.

12. Apparatus as recited in claim 11 wherein the periphery of said mold elements extend within said annular cavities with a positive clearance fit such that during the molding of said plastic component within said mold cavity, said moldable material will fill said annular cavities and be cured within said annular cavities to rigidly bond said mold elements within said annular cavities.

13. Apparatus as recited in claim 11 wherein said means for releasably securing said ring assemblies within said apertures comprise a press-fit.

14. Apparatus as recited in claim 11 wherein each of said mold elements comprise lenses.

* * * * *